United States Patent Office 3,415,858
Patented Dec. 10, 1968

3,415,858
PERFLUOROALKYLESTER MERCURIC BROMIDES
Yung Ki Kim, Midland, Mich., assignor to Dow Corning Corporation, Midland, Mich., a corporation of Michigan
No Drawing. Filed Oct. 24, 1966, Ser. No. 588,751
2 Claims. (Cl. 260—431)

ABSTRACT OF THE DISCLOSURE

Compounds of the formula $BrHgR_fCOOR^1$ in which $R_f$ is a perfluoroalkylene radical of from 2 to 10 carbon atoms and $R^1$ is an alkyl radical of from 1 to 6 carbon atoms are made by heating $BrR_fCOOR^1$ with Hg. The termediates for the preparation of perfluorodiesters of the formula $R^1OOC(R_f)_2COOR^1$.

---

Compositions of this invention are high density liquids and are thermally stable up to at least 300° C. The density of the compounds ranges up to at least 2.60 which gives a unique combination of properties making them useful as gyro flotation fluids and for other applications requiring high density, thermally stable liquids.

The compounds of this invention are also useful as intermediates for the preparation of perfluorodiesters of the formula $R'OOC(R_f)_2COOR'$. This is particularly true when one wishes to prepare mixed esters where the two R' groups are different. Esters of the above formula are claimed in the copending applications of Yung Ki Kim and Ogden R. Pierce, entitled "A Method of Preparing Dialkyl Esters of Perfluorodicarboxylic Acids," Ser. No. 588,704 filed Oct. 24, 1966.

The compounds of this invention are prepared by heating omega-bromoesters of the formula $BrR_fCOOR'$ with mercury. Reaction temperature is not critical and can range to 300° C. or above.

For the purpose of this invention $R_f$ can be any perfluoroalkylene radical of from 2 to 10 carbon atoms such as $$-CF_2CF_2-,\ -CFCF_2-,\ -(CF_2)_{10}-$$
$$\phantom{-CF_2CF_2-,\ -}|$$
$$\phantom{-CF_2CF_2-,\ -}CF_3$$

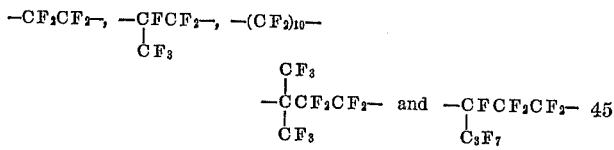

R' can be any lower alkyl radical such as methyl, ethyl, isopropyl, t-butyl or hexyl.

The starting esters employed herein are disclosed and claimed in the copending application of Yung Ki Kim, Ser. No. 571,408, filed Aug. 10, 1966, and now abandoned, which is hereby incorporated by reference in this application. Briefly, these esters are prepared by reacting $BrR_fCCl_3$ with fuming sulfuric acid and then reacting the product with an alcohol of the formula R'OH.

The following examples are illustrative only and should not be construed as limiting the invention which is properly delineated in the appended claims.

Example 1

A stirred mixture of 70 g. of $$\mathrm{CF_3}$$
$$|$$
$$\mathrm{BrCFCF_2COOC_2H_5}$$

and 1300 g. of Hg was heated at reflux under an atmosphere of dry nitrogen for 240 hours by a heating mantle set at 300° C. The reaction mixture was dissolved in methylene chloride and the excess mercury was removed along with some solid impurities. The solvent was evaporated. The crude product was distilled and there was obtained a clear liquid B.P. 84° C. at 0.65 mm. The liquid had a refractive index of 1.4615 at 25° C., and a density of 2.60 at 25° C. The liquid had a F.P. of about —35° C. and a pour point of about —20° C. This material was $$\mathrm{BrHgCFCF_2COOC_2H_5}$$
$$|$$
$$\mathrm{CF_3}$$

and its purity was shown by the fact that it gave a single peak on a gas chromatogram.

Example 2

When the following esters are reacted with Hg in accordance with the procedure of Example 1, the following products are obtained:

| Ester | Product |
|---|---|
| $Br(CF_2)_{10}COOC_6H_{13}$ | $BrHg(CF_2)_{10}COOC_6H_{13}$ |
| $BrCF_2CF_2COOCH_3$ | $BrHgCF_2CF_2COOCH_3$ |
| $BrCFCF_2CF_2COOCH(CH_3)_2$<br>$\phantom{Br}|$<br>$\phantom{BrCF}C_2F_5$ | $BrHgCFCF_2CF_2COOCH(CH_3)_2$<br>$\phantom{BrHg}|$<br>$\phantom{BrHgCF}C_2F_5$ |

That which is claimed is:

1. A compound of the formula $BrHgR_fCOOR'$ in which $R_f$ is a perfluoroalkylene radical of from 2 to 10 carbon atoms and R' is an alkyl radical of from 1 to 6 carbon atoms.

2. A compound in accordance with claim 1 in which $R_f$ is $$\mathrm{CF_3}$$
$$|$$
$$-\mathrm{CFCF_2}-$$

and R' is ethyl.

References Cited

UNITED STATES PATENTS

| | | | |
|---|---|---|---|
| 2,559,629 | 7/1951 | Berry | 260—431 XR |
| 2,824,888 | 2/1958 | Raasch | 260—431 XR |
| 3,043,859 | 7/1962 | Aldrich | 260—431 |
| 3,048,609 | 8/1962 | Miller et al. | 260—431 |
| 3,160,660 | 12/1964 | Park et al. | 260—431 XR |
| 3,294,830 | 12/1966 | Horvitz et al. | 260—431 |

TOBIAS E. LEVOW, *Primary Examiner.*

HELEN M. S. SNEED, *Assistant Examiner.*

U.S. Cl. X.R.
260—408, 487; 74—5